United States Patent [19]

Orner, Jr. et al.

[11] Patent Number: 4,489,273

[45] Date of Patent: Dec. 18, 1984

[54] APPARATUS FOR MEASURING ROTATIONAL VELOCITY OF A SHAFT

[75] Inventors: Richard L. Orner, Jr.; Charles W. Smith, both of York, Pa.

[73] Assignee: Allis-Chalmers Corporation, Milwaukee, Wis.

[21] Appl. No.: 393,184

[22] Filed: Jun. 28, 1982

[51] Int. Cl.³ .............................. G01P 3/48; G01P 3/54
[52] U.S. Cl. .................................... 324/166; 324/173
[58] Field of Search .................. 324/166, 160, 173, 174

[56] References Cited

U.S. PATENT DOCUMENTS 4,259,637 3/1981 Bloomfield et al. ............ 324/166

OTHER PUBLICATIONS

Speed Signal Generator of the Woodward Governor Co., Rockford, Illinois, Bulletin 11007B, pp. 1-12.

Primary Examiner—Stanley T. Krawczewicz
Attorney, Agent, or Firm—Timothy R. Conrad

[57] ABSTRACT

An apparatus is disclosed for mounting a rotational signal transducer on a rotary shaft where the transducer generates a signal proportional to the shaft's rotational velocity. The apparatus includes a gear mounted for rotation with the shaft. A support platform is rotatably secured to the shaft by a roller bearing. The roller bearing permits the shaft and platform to rotate relative to one another but prevents relative axial motion between the shaft and platform. A transducer is mounted on the platform and operably aligned over the gear and generates a signal as gear teeth pass the transducer. A torque rod pivotally fixed to both the platform and a stationary support restrains the platform from rotating with the shaft. The pivotal connections of the torque rod permit the platform to move axially with the shaft.

5 Claims, 3 Drawing Figures

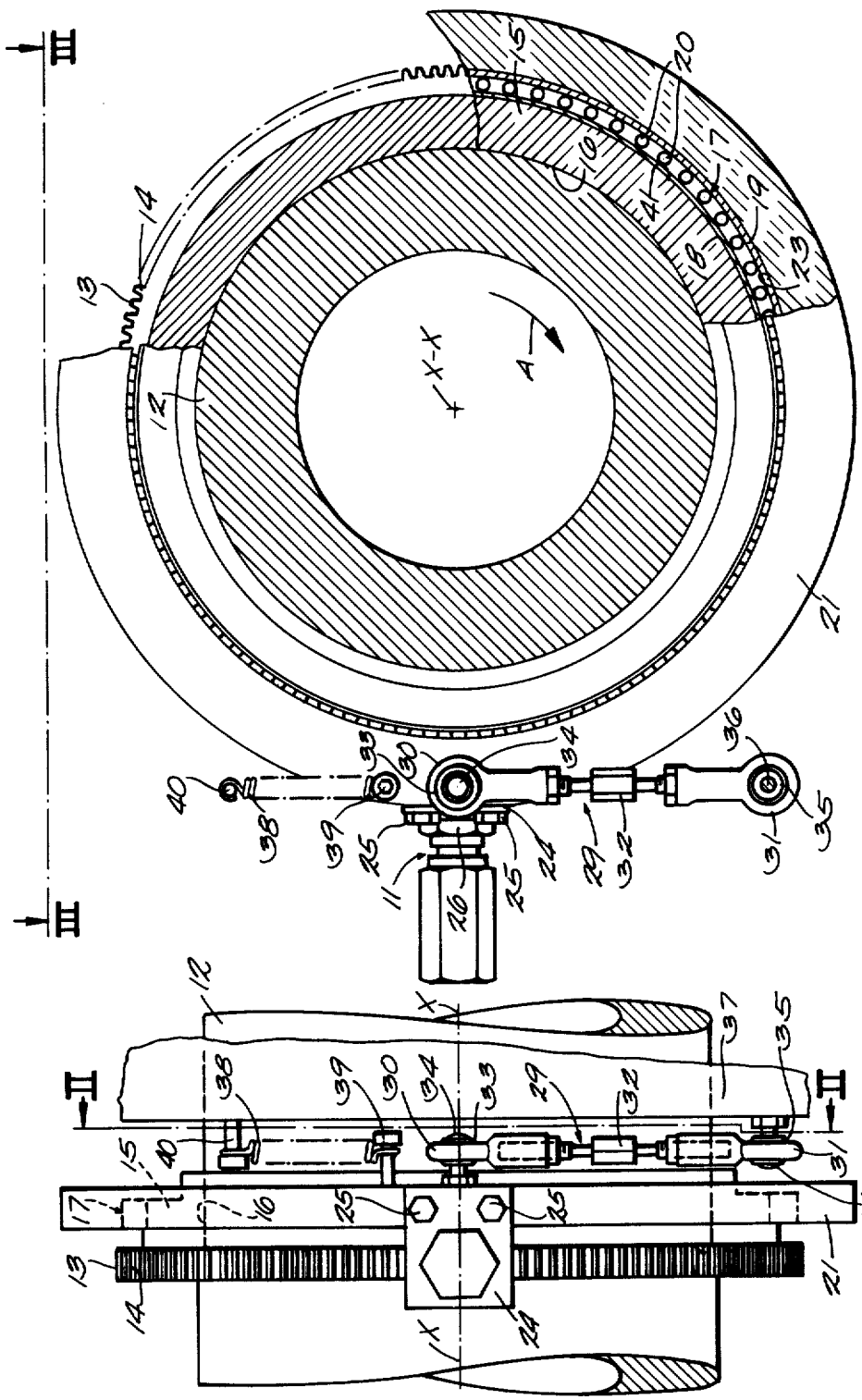

APPARATUS FOR MEASURING ROTATIONAL VELOCITY OF A SHAFT

BACKGROUND OF THE INVENTION

1. Field of the Invention

This invention relates to an apparatus for determining the rotational velocity of a rotary shaft. More particularly, this invention relates to an apparatus for mounting a transducer on a rotating shaft for detecting and measuring the rotational velocity of the shaft.

2. Description of the Prior Art

Of prior art apparatus for measuring the rotational velocity of a rotary shaft, one such apparatus is a rotational signal transducer. The transducer is mounted in a fixed position adjacent gear teeth of a gear which is fixed to the shaft. An apparatus for mounting a transducer adjacent gear teeth is shown in Bulletin 11007B, Speed Signal Generator, of the Woodward Governor Company, Rockford, Ill.

Such transducers are typically provided with a magnetic core. As the shaft and connected gear rotate, the gear teeth passing the transducer produce a change in the magnetic field about the core. Responsive to the change in the magnetic field, the transducer generates a signal having a frequency proportional to the rotational speed of the shaft. The signal is translated to provide a reading of the rotational velocity of the shaft.

One problem associated with rotational signal transducers results from axial movement of the shaft. As the shaft moves axially with relative movement between the gear and the transducer, the relative movement is detected by the transducer with a resulting modification in the generated signal. Consequently, axial movement of the shaft, even though very slight, results in a misleading reading of the rotational velocity of the shaft.

To overcome the problems associated with axial movement of the shaft, sophisticated apparatus such as described in the aforementioned bulletin, have been developed to mount the transducer over the gear teeth to avoid deceptive readings resulting from shaft axial movement. While such prior art apparatus are generally adequate for providing a reliable signal of the shaft's rotational velocity, the apparatus is typically complicated to maintain and must be located at an end of the rotary shaft. In certain applications, such as for measuring the rotational velocity of a turbine shaft in a horizontal bulb-type hydraulic turbine, critical space limitations prevent the apparatus from being located at the end of the shaft.

SUMMARY OF THE INVENTION

It is an object of the present invention to provide an apparatus for mounting on a rotary shaft a rotational signal transducer to detect and measure the rotational velocity of the shaft.

It is a further object of the present invention to provide an apparatus for mounting a transducer on a rotary shaft where the transducer does not rotate with the shaft and where the transducer will move axially with the shaft.

According to a preferred embodiment of the present invention, an apparatus is provided having a gear mounted for rotation with a rotary shaft. An annular collar fixed to the shaft receives an inner circular member of a roller bearing with the bearing having an outer circular member which is secured to an annular support platform so the support platform and shaft rotate freely with respect to one another. A rotational signal transducer is mounted on the support platform with a pick-up end of the transducer operably aligned over gear teeth of the gear. The support platform is restrained from rotating with the shaft by means of a torque rod pivotally connected to the platform and a stationary support. As the shaft moves axially, the support platform and the transducer move axially with the shaft with the pivotal connections of the torque rod permitting the axial motion while restraining the platform from rotational motion.

BRIEF DESCRIPTION OF THE DRAWINGS

FIG. 1 is a lateral view of a section of a rotary shaft equipped with an apparatus for mounting a speed signal transducer on the shaft;

FIG. 2 is a view taken along line II—II of FIG. 1; and

DESCRIPTION OF THE PREFERRED EMBODIMENT

Figure 3:
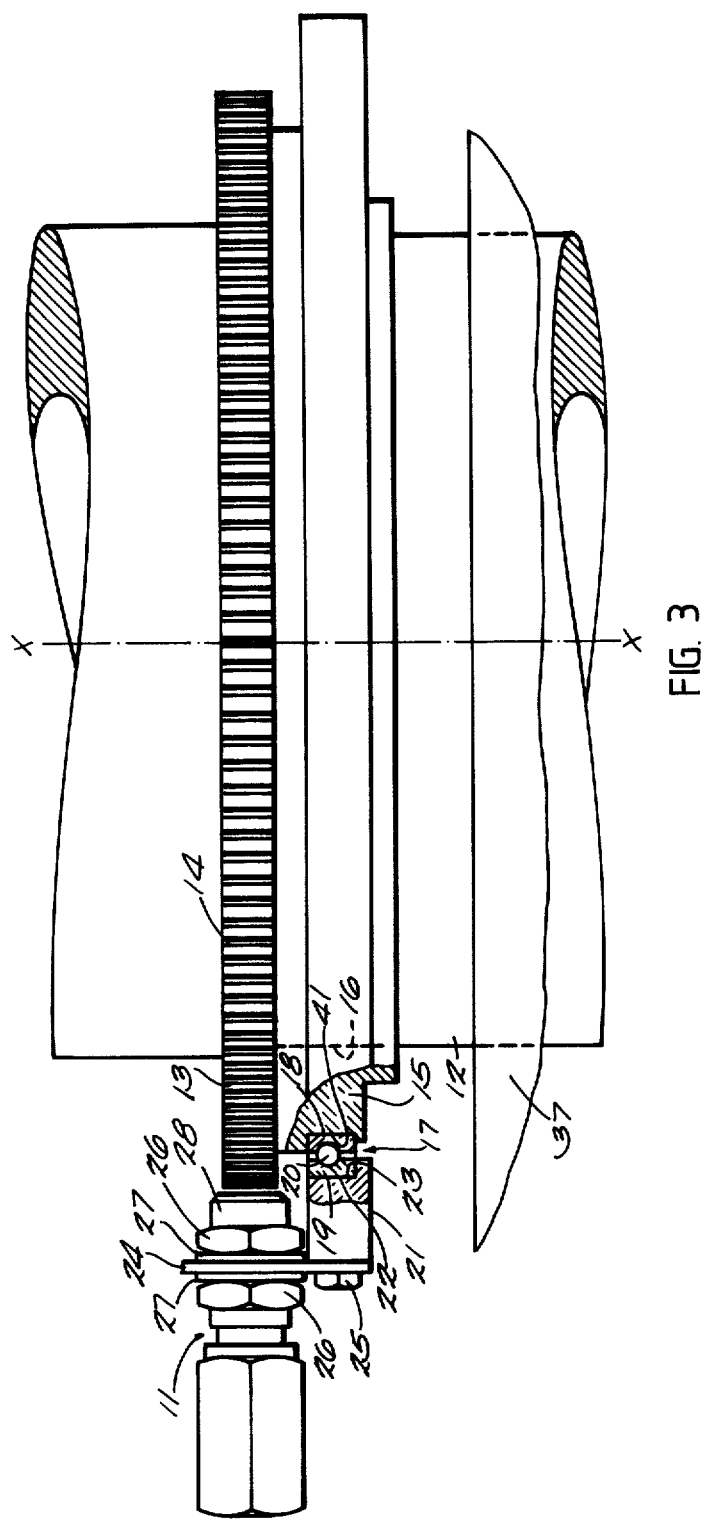
FIG. 3 is a view taken along line III—III of FIG. 2.

Referring to the drawings, an apparatus is shown for mounting a rotational signal transducer 11 to detect and measure the rotational velocity of a rotary shaft 12. In a preferred embodiment, shaft 12 is a drive shaft of a bulb-type hydraulic turbine with shaft 12 supported by a plurality of journal bearings (not shown) for rotation about a horizontal axis of rotation X—X.

The apparatus includes a gear 13 having a plurality of circumferentially spaced gear teeth 14. Gear 13 is fixed to shaft 12 intermediate of the ends of the shaft with gear 13 concentric with shaft 12 and perpendicular to axis X—X. Shaft 12 is provided with an annular collar 15 having an outer circular face 16 defining a recessed cavity 41 concentric with shaft 12 (FIG. 3).

As shown in FIGS. 2 and 3, a circular roller bearing 17 is provided comprising an inner circular member 18 and an outer circular member 19 maintained in spaced concentric relation by a plurality of ball bearings 20. Roller bearing 17 is selected to provide essentially free relative rotational motion of inner member 18 and outer member 19 while preventing relative axial movement between inner member 18 and outer member 19. It will be appreciated that roller bearings such as roller bearing 17 are commercially available items.

Inner member 18 of bearing 17 is received within the recessed cavity 41 of annular collar 15. Recessed cavity 41 is sized such that inner member 18 fits snugly within recessed cavity 41 with inner member 18 rotating with collar 15 as shaft 12 rotates. With inner member 18 secured within recessed cavity 41, roller bearing 17 is concentric with shaft 12 and parallel to gear 13. An annular support platform 21 is provided having an inner circular face 22 defining a recessed cavity 23 sized to snugly receive outer member 19 of bearing 17 with outer member 19 restrained from motion relative to support platform 21.

Transducer 11 is mounted on support platform 21 by means of a mounting plate 24 secured to platform 21 by a plurality of bolts 25 (FIGS. 1 and 3). Transducer 11 is received through a hole in plate 24 and fixed within plate 24 by nuts 26 engaging nonconductive washers 27. The transducer is mounted with a pick-up end 28 preferably no further than 0.025 inches from teeth 14. Transducer 11 is operably connected by means (not shown) well known in the art to apparatus for providing a reading of the rotational velocity of the shaft in response to signals generated by transducer 11. Such means and apparatus are more fully described in the aforementioned bulletin of the Woodward Generator Company.

A torque rod 29, or restraining rod, is provided comprising a first socket joint 30 and second socket joint 31 joined by a turnbuckle 32 (FIGS. 1 and 2). First socket joint 30 receives a ball 33 fixed to a first support pin 34 extending perpendicularly from support platform 21 on a side thereof remote from transducer 11 and at a location of platform 21 where transducer 11 is fixed. Ball 33 and first socket 30 cooperate to form a pivotal ball and socket joint. Second socket joint 31 receives a ball 35 fixed to a second support pin 36 which in turn is fixed to a stationary support 37 on a side of torque rod 29 remote from platform 21. Second socket joint 31 and ball 35 likewise cooperate to form a pivotal ball and socket joint. As shown in FIG. 2, torque rod 29 is positioned to extend generally tangential and opposite the shaft's direction of rotation (indicated by the arrow, A, in FIG. 2).

Stationary support 37 may be any suitable stationary object. In a preferred embodiment in a hydraulic turbine, stationary support 37 is a housing for a journal bearing which supports shaft 12.

A spring 38 is provided to preload torque rod 29. Spring 38 is fixed to platform 21 by a third support pin 39 on a side of first sprocket 30 remote from second sprocket 31 and extends away from first sprocket 30 generally colinear with torque rod 29 to a fourth support pin 40 fixed to stationary support 37.

In the operation of the apparatus, shaft 12 rotates in the direction indicated by arrow A. As shaft 12 rotates, gear 13 simultaneously rotates as does collar 15 and inner member 18 of roller bearing 17. Support platform 21, secured to outer member 19 of roller bearing 17, is restrained from rotating with shaft 12 by torque rod 29 which overcomes the inherent friction of roller bearing 17. Spring 38 preloads torque rod 29 thereby preventing rotation and vibration of platform 21 by reason of machining tolerances in torque rod 29. Consequently, transducer 11 maintains a fixed position as gear 13 rotates. Transducer 11 detects the rotation of gear 13 and generates a signal having a frequency proportional to the rotational velocity of shaft 12.

As shaft 12 skates (i.e., moves axially within the supporting journal bearings), gear 13 and collar 15 move axially with the shaft 12. Roller bearing 17 secured to collar 15 and platform 21 causes platform 21 to move axially with shaft 12 thereby preventing relative axial movement between gear 13 and transducer 11. The pivotal ball and socket joints formed by first socket 30 and ball 33 and second socket 31 and ball 35 permit the axial motion of platform 21 relative to the stationary support 37. While platform 21 moves axially, torque rod 29, preloaded by spring 38, prevents platform 21 from rotational movement. Accordingly, transducer 11 continues to generate a reliable signal proportional to the shafts rotational velocity as the shaft moves axially.

From the foregoing detailed description of the present invention, it has been shown how the objects of the present invention have been attained in a preferred manner. However, modification and equivalents of the disclosed concepts such as readily occur to those skilled in the art are intended to be included in the scope of this invention. Thus, the scope of the invention is intended to be limited only by the scope of the claims such as are, or may hereafter be, appended hereto.

The embodiments of the invention in which an exclusive property or privilege is claimed are defined as follows:

1. An apparatus for measuring the rotational speed of a rotary shaft which rotates relative to a stationary member about an axis of rotation comprising:
   a gear affixed to said shaft for rotation therewith and concentric with said axis of rotation;
   a roller bearing assembly having an inner circular member secured to said shaft for rotation therewith and an outer circular member coupled to said inner member with said inner and outer members freely movable relative to one another in a circular path concentric with said axis and restrained from relative axial movements;
   a rotational signal transducer;
   means for securing said rotational signal transducer to said outer circular member with said transducer positioned to detect and measure the rotational speed of said gear;
   a restraining rod having a first end pivotally connected to said transducer; said rod extending from said first end tangentially to said axis of rotation and terminating at a second end pivotally connected to said stationary member with said pivotable connections permitting nonrotational movement of said transducer with said shift with said roller bearing assembly preventing axial and radial movement of said transducer relative to said shaft.

2. An apparatus according to claim 1 wherein said first end of said rod is pivotally connected to said transducer by a ball and socket connection and said second end of said rod is pivotally connected to said stationary support by a ball and socket connection.

3. An apparatus according to claim 2 comprising means for adjusting a tension of said restraining rod.

4. An apparatus according to claim 3 wherein said restraining rod extends tangentially in a direction opposite a direction of rotation of said shaft.

5. An apparatus according to claim 4 comprising a spring for preloading said restraining rod having a first end connected to said transducer and extending therefrom in a direction opposite said restraining rod to a second end secured to said stationary member; said means for adjusting said restraining rod comprising a turnbuckle intermediate said first and second ends of said rod.

* * * * *